(12) United States Patent
Jaipuria et al.

(10) Patent No.: US 11,042,758 B2
(45) Date of Patent: Jun. 22, 2021

(54) VEHICLE IMAGE GENERATION

(71) Applicant: Ford Global Technologies, LLC, Dearborn, MI (US)

(72) Inventors: Nikita Jaipuria, Union City, CA (US); Gautham Sholingar, Sunnyvale, CA (US); Vidya Nariyambut Murali, Sunnyvale, CA (US); Rohan Bhasin, Santa Clara, CA (US); Akhil Perincherry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 16/460,066

(22) Filed: Jul. 2, 2019

(65) Prior Publication Data
US 2021/0004608 A1    Jan. 7, 2021

(51) Int. Cl.
| G06K 9/62 | (2006.01) |
| G06K 9/00 | (2006.01) |
| G06N 3/08 | (2006.01) |
| G06T 15/06 | (2011.01) |
| G06T 7/70 | (2017.01) |

(52) U.S. Cl.
CPC ......... *G06K 9/00791* (2013.01); *G06N 3/088* (2013.01); *G06T 7/70* (2017.01); *G06T 15/06* (2013.01); *G06T 2207/20081* (2013.01); *G06T 2207/20084* (2013.01); *G06T 2207/30236* (2013.01); *G06T 2207/30252* (2013.01)

(58) Field of Classification Search
CPC . G06T 2207/30252; G06T 2207/30236; G06T 2207/20081; G06T 2207/20084; G06T 15/06; G06T 7/70; G06K 9/00791; G06N 3/088
See application file for complete search history.

(56) References Cited

U.S. PATENT DOCUMENTS

| 9,996,771 B2 | 6/2018 | Clayton et al. | |
| 2009/0244084 A1* | 10/2009 | Dammertz | G06T 11/001 345/586 |
| 2011/0263332 A1* | 10/2011 | Mizrachi | A63F 13/358 463/42 |

(Continued)

OTHER PUBLICATIONS

Ming-Yu Liu et al, (Unsupervised Image-to-Image Translation Networks, 31st Conference on Neural Information Processing Systems (NIPS 2017), Long Beach, CA, USA, pp. 1-9) (Year: 2017).*

(Continued)

*Primary Examiner* — Amara Abdi
(74) *Attorney, Agent, or Firm* — Frank A. MacKenzie; Bejin Bieneman PLC (57) ABSTRACT

A computer, including a processor and a memory, the memory including instructions to be executed by the processor to generate a synthetic image and corresponding ground truth and generate a plurality of domain adapted synthetic images by processing the synthetic image with a variational auto encoder-generative adversarial network (VAE-GAN), wherein the VAE-GAN is trained to adapt the synthetic image from a first domain to a second domain. The instructions can include further instructions to train a deep neural network (DNN) based on the domain adapted synthetic images and the corresponding ground truth and process images with the trained deep neural network to determine objects.

20 Claims, 6 Drawing Sheets

(56) References Cited

U.S. PATENT DOCUMENTS

| | | | |
|---|---|---|---|
| 2015/0169945 A1* | 6/2015 | Connell, II | G06K 9/6203 |
| | | | 382/118 |
| 2017/0166204 A1* | 6/2017 | Yoo | B62D 15/0265 |
| 2017/0278296 A1* | 9/2017 | Chui | G06T 17/10 |
| 2018/0189607 A1 | 7/2018 | Cocias et al. | |
| 2018/0247201 A1 | 8/2018 | Liu et al. | |
| 2018/0307947 A1 | 10/2018 | Choi et al. | |
| 2019/0005386 A1 | 1/2019 | Chen et al. | |
| 2019/0244060 A1* | 8/2019 | Dundar | G06K 9/6256 |
| 2019/0287217 A1* | 9/2019 | Cooke | G06N 3/0472 |

OTHER PUBLICATIONS

Akbari et al, ("Semi-recurrent CNN-based VAE-GAN for sequential data generation", School of Engineering Science, Simon Fraser University, Burnaby, BC, Canada, IEEE 2019, pp. 2321-2325) (Year: 2019).*

Soumya Tripathy, et. al., "Learning Image-to-Image Translation Using Paired and Unpaired Training Samples", retrieved from arXiv:1805.03189v1 [cs.CV] May 8, 2018 (19 pages).

Ming-Yu Liu, et. al., "Unsupervised Image-to-Image Translation Networks", retrieved from arXiv:1703.00848v6 [cs.CV] Jul. 23, 2018 (11 pages).

* cited by examiner

VEHICLE IMAGE GENERATION

BACKGROUND

Vehicles can be equipped with computing devices, networks, sensors and controllers to acquire information regarding the vehicle's environment and to operate the vehicle based on the information. Vehicle sensors can provide data concerning routes to be traveled and objects to be avoided in the vehicle's environment. Operation of the vehicle can rely upon acquiring accurate and timely information regarding objects in a vehicle's environment while the vehicle is being operated on a roadway.

DETAILED DESCRIPTION

Vehicles can be equipped to operate in both autonomous and occupant piloted mode. By a semi- or fully-autonomous mode, we mean a mode of operation wherein a vehicle can be piloted partly or entirely by a computing device as part of an information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle so as to travel along the path. The data regarding the external environment can include the location of one or more moving objects such as vehicles and pedestrians, etc., in an environment around a vehicle and can be used by a computing device in the vehicle to operate the vehicle.

Operating a vehicle based on moving object data can include determining a vehicle path that avoids moving objects. Predicting a path for moving objects that includes future locations for moving objects can permit a computing device to determine a vehicle path that avoids moving objects. A computing device can operate a vehicle by training a deep neural network (DNN) included in the vehicle to predict a future location for a moving object. The computing device can determine a vehicle path upon which to operate the vehicle that avoids the moving object based on the predicted future location. Techniques discussed herein can improve training the DNN by creating large numbers (>1,000) of training images generated by adding domain data to synthetic images. Adding domain data to a synthetic image can include modifying the synthetic image to simulate the effects of different environmental conditions or noise factors such as precipitation including rain or snow, atmospheric/lighting conditions including fog or night, and seasonal conditions including winter and spring. Using a large dataset of training images that include many different examples of each domain in a realistic fashion can make a DNN more robust, where robust means that a DNN is likely to correctly identify and locate objects in previously unseen real world input images.

Disclosed herein is method including generating a synthetic image and corresponding ground truth, generating a plurality of domain adapted synthetic images by processing the synthetic image with a variational auto encoder-generative adversarial network (VAE-GAN), wherein the VAE-GAN is trained to adapt the synthetic image from a first domain to a second domain, training a deep neural network (DNN) based on the domain adapted synthetic images and the corresponding ground truth and processing images with the trained deep neural network to determine objects. The synthetic image can be adapted from a first domain to a second domain by modifying the synthetic image to change weather and lighting conditions in the synthetic image. The VAE-GAN can be trained based on unsupervised learning. The VAE-GAN can include an encoder neural network, a generator neural network and a discriminator neural network wherein the encoder neural network generates hidden variables, the generator neural network generates a modified synthetic image based on hidden variables and the discriminator determines whether the modified synthetic image is similar to a real image.

Determining whether the modified synthetic image can be similar to a real image by determining a loss function based on real images. The synthetic images and corresponding ground truth can be generated with a photorealistic rendering process. The photorealistic rendering process can generate the synthetic image and corresponding ground truth based on ray tracing a scene description. Ray tracing can include tracing a ray of light from a virtual illumination source as it reflects from a surface included in a scene description into a lens of a virtual camera. Objects and locations determined in a traffic scene can be communicated to a vehicle. The vehicle can be operated based on determining a vehicle path based on the objects and locations. The moving objects can include one or more of a pedestrian and a vehicle. The VAE-GAN can be trained by constraining hidden variables to be consistent with a desired output domain. The hidden variables can be assumed to have Gaussian distributions. The hidden variables can be processed using Bayesian inference applied to the mean and standard deviations of the Gaussian distributions.

Further disclosed is a computer readable medium, storing program instructions for executing some or all of the above method steps. Further disclosed is a computer programmed for executing some or all of the above method steps, including a computer apparatus, programmed to generate a synthetic image and corresponding ground truth, generate a plurality of domain adapted synthetic images by processing the synthetic image with a variational auto encoder-generative adversarial network (VAE-GAN), wherein the VAE- GAN is trained to adapt the synthetic image from a first domain to a second domain, train a deep neural network (DNN) based on the domain adapted synthetic images and the corresponding ground truth and process images with the trained deep neural network to determine objects. The synthetic image can be adapted from a first domain to a second domain by modifying the synthetic image to change weather and lighting conditions in the synthetic image. The VAE-GAN can be trained based on unsupervised learning. The VAE-GAN can include an encoder neural network, a generator neural network and a discriminator neural network wherein the encoder neural network generates hidden variables, the generator neural network generates a modified synthetic image based on hidden variables and the discriminator determines whether the modified synthetic image is similar to a real image.

The computer can be further programmed to determine whether the modified synthetic image can be similar to a real image by determining a loss function based on real images. The synthetic images and corresponding ground truth can be generated with a photorealistic rendering process. The photorealistic rendering process can generate the synthetic image and corresponding ground truth based on ray tracing a scene description. Ray tracing can include tracing a ray of light from a virtual illumination source as it reflects from a surface included in a scene description into a lens of a virtual camera. Objects and locations determined in a traffic scene can be communicated to a vehicle. The vehicle can be operated based on determining a vehicle path based on the objects and locations. The moving objects can include one or more of a pedestrian and a vehicle. The VAE-GAN can be trained by constraining hidden variables to be consistent with a desired output domain. The hidden variables can be assumed to have Gaussian distributions. The hidden variables can be processed using Bayesian inference applied to the mean and standard deviations of the Gaussian distributions.

Figure 1:
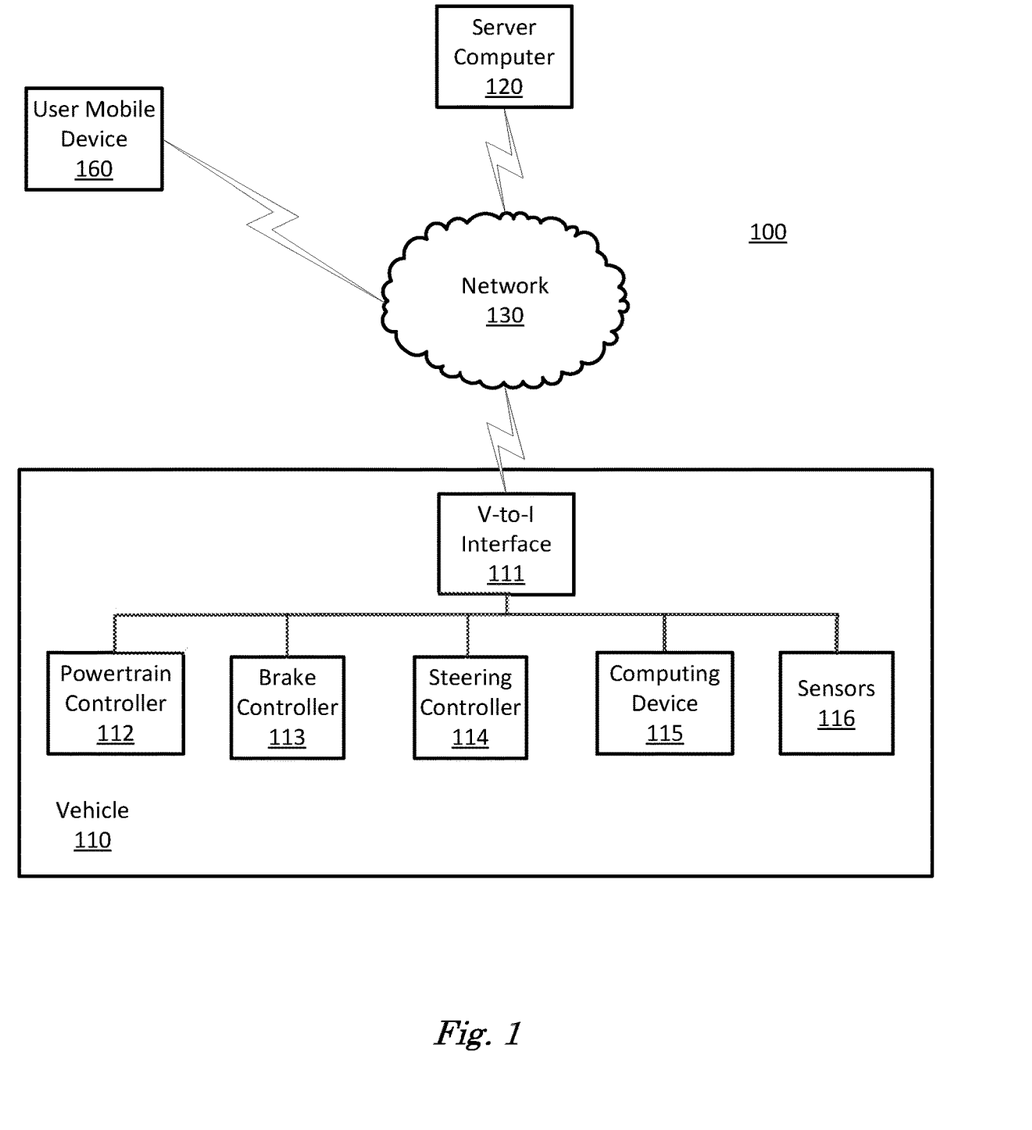
FIG. 1 is a block diagram of an example traffic infrastructure system.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive information regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
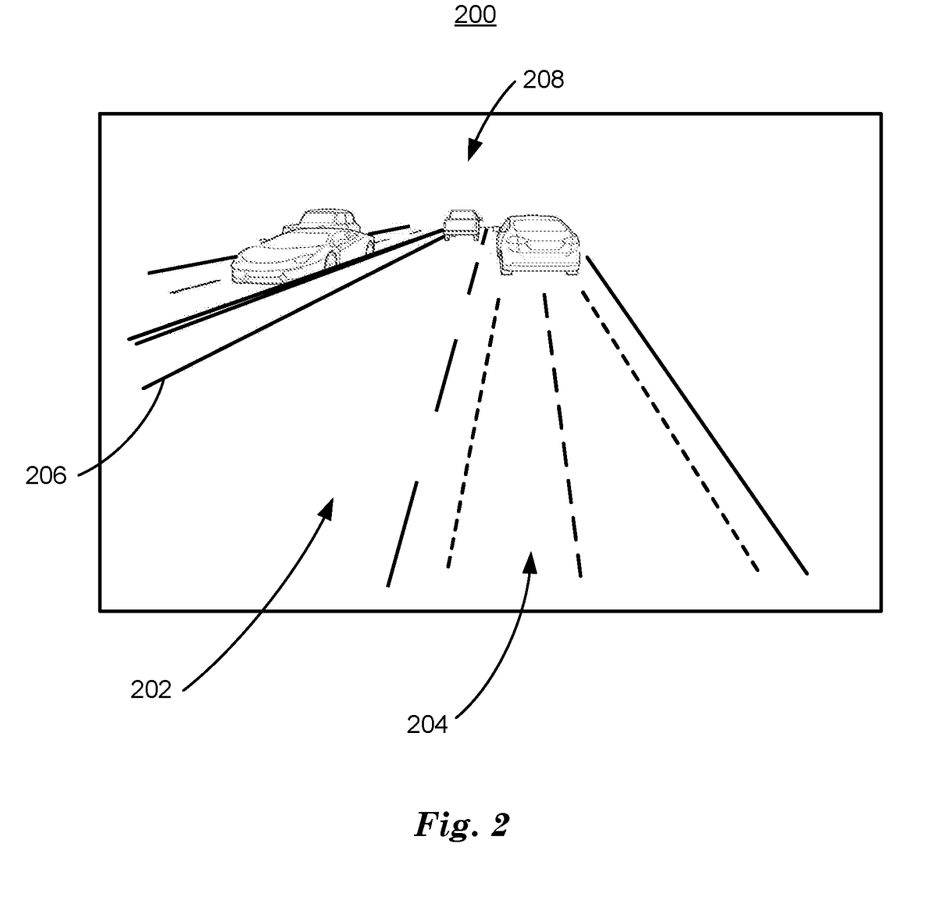
FIG. 2 is a diagram of an example traffic scene.

FIG. 2 is an example diagram of an example traffic scene 200. Traffic scene 200 includes a roadway 202 having lane markers 204, a traffic barrier 206 and vehicles 208. A computing device 115 in a vehicle 110 can acquire a red, green, and blue (RGB) color video images of traffic scene 200 corresponding to an environment around the vehicle 110 using a sensor 116 included in vehicle 110. The computing device can also acquire other types of video images including greyscale, near infrared, far infrared video images, for example. A video image can be processed by a computing device 115 to determine an identity and location of objects in the environment around a vehicle using a deep neural network (DNN). A DNN is a software program that includes a plurality of convolutional layers and a plurality of fully-connected layers that process input image data to determine an identity and location for objects in an input video image. A DNN can also determine other data regarding objects in a video image such as size and orientation. In a video image of traffic scene 200 a DNN can be trained to identify and locate a roadway 202, lane markings 204, a lane barrier 205 and vehicle 208, for example.

Training a DNN to reliably process video images of traffic scenes can require a large number (>1,000) of video images and corresponding ground truth. Acquiring a large number of real world video images and ground truth can be expensive and time-consuming. For example, a vehicle or other moving platform can be equipped with a video sensor and a computing device to drive on real world roadways to acquire and record video images. Video images and corresponding ground truth can be obtained more efficiently using a rendering process that takes as input a scene description that includes mathematical data corresponding to a three-dimensional (3D) map describing locations and surface reflectance of objects and regions in a scene and a virtual sensor which includes a mathematical description of the field of view of the virtual sensor. The photorealistic rendering process inputs the scene description and outputs a photorealistic video image. Photorealistic in the present context means that a video image appears to an observer as if it were acquired with a real-world camera viewing a real-world scene, rather than rendered from scene description and virtual sensor data. Photorealistic rendering can be performed by ray tracing, where a sample of light rays from one or more virtual illumination sources (lamps, sunlight, etc.) are traced from the light source as they reflect from surfaces in a 3D map through a virtual lens into a location on a virtual sensor plane of a virtual camera to create a video image. Ray tracing a large number of light rays in this fashion can create a synthetic video image that appears to an observer to be a realistic photograph of a real scene acquired with a real video camera.

An example of a photorealistic rendering process is Unreal Engine. Unreal Engine a photorealistic rendering process that inputs scene description and generates photorealistic output images corresponding to user specified light sources and virtual video cameras. Unreal Engine includes a suite of integrated development tools for the design and build of games, simulations, and visualizations available from Epic Games, Inc. (see www.unrealengine.com). In this example, Unreal Engine inputs a scene description and outputs video images that correspond to a traffic scene 200. A rendering process such as provided by Unreal Engine or the like can produce hundreds of video images corresponding to hundreds of different traffic scenes 200 far more efficiently than equipping vehicles with video sensors and computing devices.

Figure 3:
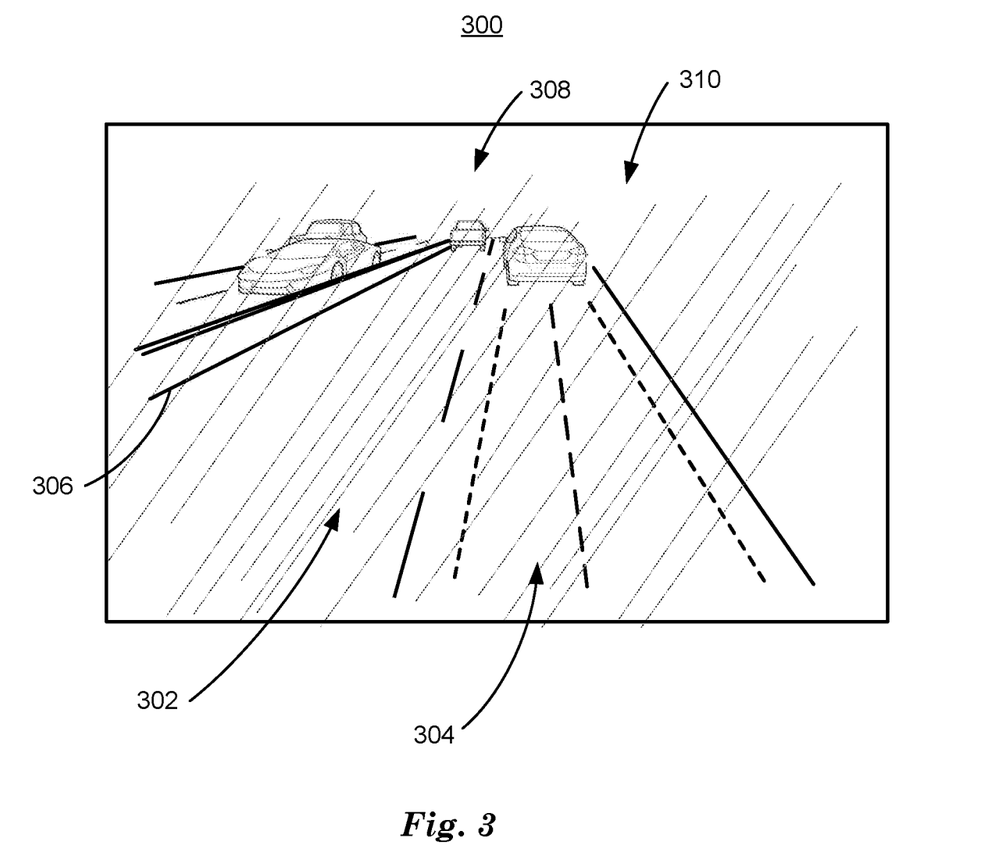
FIG. 3 is a diagram of another example traffic scene.

FIG. 3 is a diagram of an example traffic scene 300. Traffic scene 300 includes a roadway 302 having lane markers 304, a traffic barrier 306 and vehicle 308. A traffic scene 200, 300 includes image data corresponding to environmental conditions that define a domain. A domain is defined by environmental conditions that affect the overall appearance of a video image. Domain data is defined as pixel values in the video image that correspond to the environmental conditions. Environmental conditions include atmospheric effect such as weather, lighting conditions such as time of day or background effects such as snow cover. These environmental effects modify the pixel values of a video image in a consistent fashion and can also be referred to as image noise data. For example, traffic scene 200 corresponds to a sunny, summer, daytime domain, while traffic scene 300 includes rain 310, illustrated by dashed lines, and therefore corresponds to a rain precipitation domain. Example domains in addition to sunny and rain, can include snow, sleet, hail, fog, day, night, winter, spring, summer, fall etc., all of which correspond to different overall appearances of acquired video images. In operation, a vehicle can be expected to encounter a variety of weather and lighting conditions corresponding to a variety of domains. To be able to reliably identify and location objects in video images acquired from previously unseen traffic scenes, a DNN can be trained using video images of traffic scenes acquired in a plurality of different domains.

Photorealistic rendering programs like Unreal Engine can have difficulty rendering some domains accurately. Photorealistic rendering programs can receive user input that can specify the domain (rain, snow, fog, night, etc.) into which to render a scene description to form a synthetic video image. A problem with photorealistic rendering programs is that image domains generally include a wide variety of different appearances for each image domain, while photorealistic rendering programs rely on far fewer examples of domain data. For example, real world video images of traffic scenes including rain will vary widely in appearance depending upon a wide variety of intensities and directions of the rain, for example. Photorealistic rendering programs typically rely on far less variation in the mathematical descriptions or rain that results in far less variation in appearance of the domain in synthetic video images. A DNN trained on synthetic images with synthetically generated rain will therefore not be as successful in recognizing objects as a DNN trained using video images acquired with a real video sensor from real world traffic scenes.

Techniques described herein improve generation of synthetic video images corresponding to multiple image domains by modifying input synthetic video images rendered in one image domain, for example sunny, into another image domain, for example rain, by processing the input synthetic video image with a trained variational auto encoder-generative adversarial network (VAE-GAN). A VAE-GAN is a neural network configured to input a synthetic video image rendered in a first image domain and output a video image modified to appear as an accurate photorealistic video image rendered in a second domain, where an accurate photorealistic video image is defined as a synthetic image that appears to an observer as if it had been acquired with a real world video sensor including accurate and realistic rendering of the second domain data. The accurate photorealistic video image including second domain data can be used to train a DNN to recognize objects in real world video images.

Figure 4:
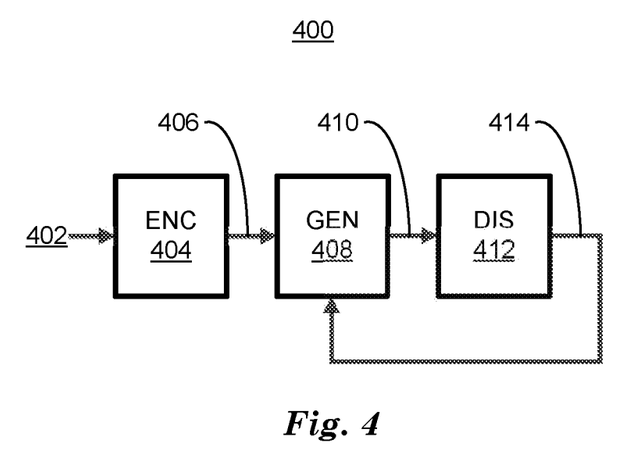
FIG. 4 is a diagram of an example variational auto encoder-generative adversarial network (VAE-GAN) during training.

FIG. 4 is a diagram of an example VAE-GAN 400 neural network configured for training. A training time, VAE-GAN 400 inputs a real world video images 402 of traffic scenes corresponding to both a first domain and a second domain. For example, the training dataset can include real world video images corresponding to day domains and night domains. The real world video images 402 can be unpaired, for example the day domain and night domain video images can correspond to different traffic scenes. This type of training is referred to as unsupervised learning. The variational auto encoder portion of VAE-GAN 400 includes an encoder 404 (ENC) and a generator 408 (GEN). A variational auto encoder is a neural network that can be trained to generate images that correspond to a single domain by constraining encoder 404 to generate hidden variables 406, also referred to a "latent space", consistent with a desired output domain. The encoder 404 includes a plurality of convolutional layers that encodes an input video image 402 into hidden variables 406 that are assumed to have Gaussian distributions. The hidden variables 406 can be then be processed using Bayesian inference applied to means and standard deviations of the Gaussian distributions to determine weights and biases for the encoder 404 and generator 408 that generates output video images that correspond to a second domain based on input video images 402 from a first domain. The hidden variables 406 are input to generator 408 which uses a plurality of convolutional layers programmed to transform the hidden variables 406 into an output video image 410 that corresponds to the input video image 402 transformed into a user selected domain. For example, a VAE-GAN 400 neural network can be trained to output photorealistic synthetic video images corresponding to a rain domain based on input photorealistic synthetic video images corresponding to a sunny domain.

Generator 408 and discriminator 412 (DIS) portions of VAE-GAN 400 correspond to a generative adversarial network. A generative adversarial network is a neural network that generates outputs and tests the outputs to determine whether the outputs correspond to real data using a loss function. The loss function 414 is derived from a comparison of the output video image 410 to probability distributions derived from real world image data to determine whether the output video image 410 is similar to real world image data despite not having a real world image that exactly corresponds to the output video image 410. A synthetic image is similar to a real image if an observer would not be able to distinguish between the modified synthetic image and a real image. Similarity is measured by a loss function calculated between the modified synthetic image and probability distributions derived from real images. The output video image 410 can be described by a probability distribution $p_\phi(x|z)$, where $\phi$ is the weights and biases included in encoder 404 and generator 408, x is the output video image 410 and z are the hidden variables 406. The information loss corresponding to the encoder 404/ generator 408 function can be determined using a log-likelihood function $\log p_\phi(x|z)$ to determine how effectively the generator has learned to reconstruct an input video image 402 given a hidden variable 406 representation. Comparing the log-likelihood function to an expected value for the loss function based on a probability distribution of loss functions over the set of all input video images 402 can determine a loss function 414 for a single input video image 402. This loss function 414 can be back propagated to the encoder 404/generator 408 section of VAE-GAN 400 at training time to train VAE-GAN 400 to output video images 410 that match input video images 402 belonging to one selected domain. For example, in this fashion VAE-GAN 400 can be trained to output video images 410 corresponding to one selected domain (winter, rain, night, etc.) despite input video images 402 corresponding to another domain (summer, sunny, day, etc.).

Figure 5:
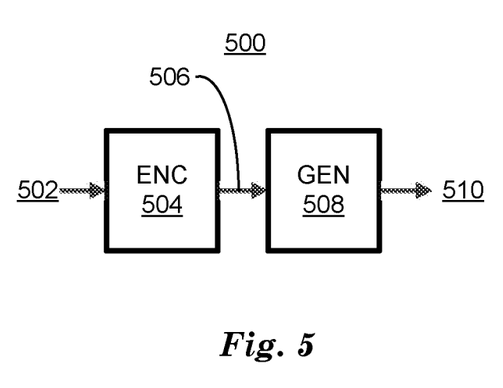
FIG. 5 is a diagram of an example variational auto encoder-generative adversarial network (VAE-GAN) during operation.

FIG. 5 is a diagram of a trained VAE-GAN 500 in operation, where VAE-GAN 500 has been trained as described above in relation to FIG. 4 to output synthetic video images 510 corresponding to a selected second domain, in spite of inputting synthetic video images 502 corresponding to a first domain. In other examples of neural networks neural networks including a conditional generative adversarial (GAN) network, a GAN by itself without a VAE portion, or a VAE by itself without a GAN can be trained to produce photorealistic video images 410 corresponding to one or more domains as described herein. As described above, encoder 504 (ENC) produces hidden variables 406 filtered at training time to output to generator 508 (GEN) to produce output synthetic video images 510 corresponding to a second output domain for all input synthetic video images 502. For example, VAE-GAN 500 can be trained to input synthetic video images 502 corresponding to a sunny summer day domain and output synthetic video images 510 corresponding to a winter night domain. In this fashion, a plurality of VAE-GANs 500 can trained to output synthetic video images 510 corresponding to a plurality of output domains using a input from a single input domain and thereby produce hundreds of video images corresponding to a variety of image domains to train a DNN to recognize objects such as vehicles and pedestrians in real world video images.

Figure 6:
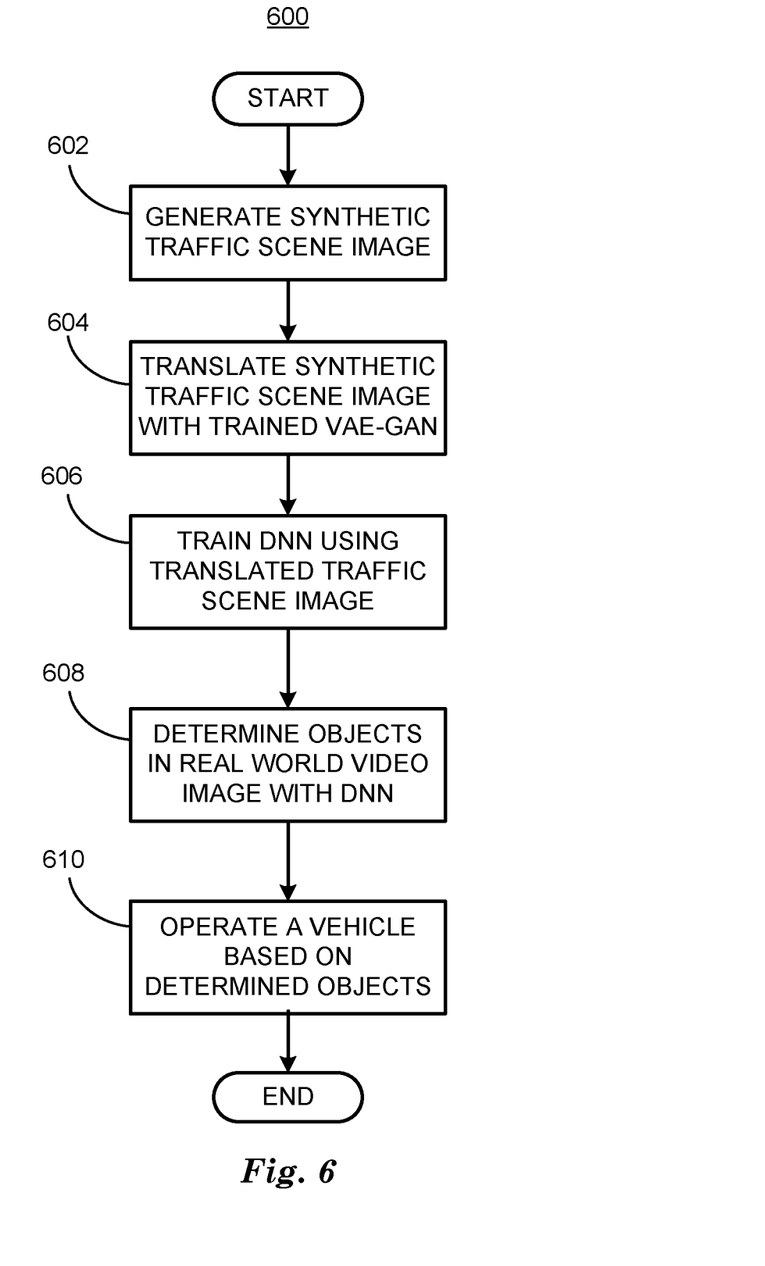
FIG. 6 is a flowchart diagram of a process to use a VAE-GAN to generate training images for a deep neural network (DNN).

FIG. 6 is a diagram of a flowchart, described in relation to FIGS. 1-5, of a process 600 for generating a dataset of images for training a DNN to operate a vehicle. Process 600 can be implemented by a processor of computing device, taking as input information from sensors, and executing commands, and outputting object information, for example. Process 600 includes multiple blocks that can be executed in the illustrated order. Process 600 could alternatively or additionally include fewer blocks or can include the blocks executed in different orders.

Process 600 begins at block 602, where process 600 generates synthetic video images based on scene descriptions that include mathematical descriptions of objects including vehicles and pedestrians as discussed above in relation to FIG. 2. Process 600 can generate a large number of synthetic images, greater than hundreds, for example, that include atmospheric conditions that correspond to a single domain, for example a sunny, summer day.

At block 604 process 600 transforms the synthetic image data from block 602 from a first domain into a second domain while maintaining variety and photorealism using a trained VAE-GAN 500 as discussed above in relation to FIGS. 4 and 5. For example, synthetic image data can be transformed from a sunny, summer day domain to a winter, night domain. A VAE-GAN 500 can be trained for each domain pair transform. i.e. sunny to rain, day to night, summer to winter, etc.

At block 606 the untransformed and transformed synthetic video images can be used to train a DNN to identify and location objects in real world video images. The DNN is trained by inputting the transformed or untransformed synthetic image data and comparing the output results with ground truth based on the scene description that generated the synthetic image, because the scene description includes the identity and location of objects in the synthetic image. By training the DNN with a dataset that includes a large number of synthetic video images that correspond to a variety of domains the probability that the DNN will correctly identify and locate objects in a video image acquired from a previously unseen traffic scene will be improved.

At block 608 process 600 determines an object identity and location by processing an acquired real world video image with the DNN trained at block 606. The DNN can output the object location in coordinates relative to an input video image frame, for example. A computing device 115 in a vehicle 110 can transform the image coordinates into global coordinates based on data regarding the location and field of view of the video sensor that acquired the video image. Global coordinates are the location of an object measured with respect to latitude, longitude and altitude, for example. A DNN trained in this fashion can be used for a variety of tasks related to vehicle operation that rely on recognizing objects and locations in video images corresponding to the environment around a vehicle. For example, lane keeping, where a computing device determines traffic lanes in a roadway, object avoidance, where a computing device determines locations of objects or location, where a computing device determines a locations with respect to map data can be performed by a DNN trained in this fashion.

At block 610 a computing device 115 can operate a vehicle 110 based on the objects identities and locations determined at block 608, above. Computing device can operate a vehicle 110 by determining a vehicle path upon which to operate and then operating the vehicle 110 by controlling vehicle powerplant, steering and brake via controllers 112, 113, 114 to cause vehicle 110 to move along the vehicle path. The vehicle path can be determined to avoid identified and located objects, where objects can include vehicles and pedestrians. Following block 610 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a,"

"the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A computer, comprising a processor; and
   a memory, the memory including instructions to be executed by the processor to:
   generate a synthetic image and corresponding ground truth;
   generate a plurality of domain adapted synthetic images by processing the synthetic image with a variational auto encoder-generative adversarial network (VAE-GAN), wherein the VAE-GAN includes an encoder neural network, a generator neural network and a discriminator neural network wherein the encoder neural network generates hidden variables, the generator neural network generates one modified synthetic image based on hidden variables and the discriminator determines whether the one modified synthetic image is similar to a real image and wherein the VAE-GAN is trained to adapt the one synthetic image from a first domain to a second domain using real images as input and determining a loss function based on real images;
   train a deep neural network (DNN) based on the domain adapted synthetic images and the corresponding ground truth; and
   process images with the trained deep neural network to determine objects.

2. The computer of claim 1, the instructions further including instructions to adapt the synthetic image from a first domain to a second domain by modifying the synthetic image to change weather and lighting conditions in the synthetic image.

3. The computer of claim 1, the instructions further including instructions to train the VAE-GAN based on unsupervised learning.

4. The computer of claim 1, the instructions further including instructions to generate the synthetic images and corresponding ground truth with a photorealistic rendering process.

5. The computer of claim 4, wherein the photorealistic rendering process generates the synthetic image and corresponding ground truth based on ray tracing a scene description.

6. The computer of claim 1, wherein ray tracing includes tracing a ray of light from a virtual illumination source as it reflects from a surface included in a scene description into a lens of a virtual camera.

7. The computer of claim 1, the instructions further including instructions to communicate objects and locations determined in a traffic scene to a vehicle.

8. The computer of claim 7, the instructions further including instructions to operate the vehicle based on determining a vehicle path based on the objects and locations.

9. A method, comprising:
   generating a synthetic image and corresponding ground truth;
   generating a plurality of domain adapted synthetic images by processing the synthetic image with a variational auto encoder-generative adversarial network (VAE-GAN), wherein the VAE-GAN includes an encoder neural network, a generator neural network and a discriminator neural network wherein the encoder neural network generates hidden variables, the generator neural network generates one modified synthetic image based on hidden variables and the discriminator determines whether the one modified synthetic image is similar to a real image and wherein the VAE-GAN is trained to adapt the one synthetic image from a first domain to a second domain using real images as input and determining a loss function based on real images;
   training a deep neural network (DNN) based on the domain adapted synthetic images and the corresponding ground truth; and
   processing images with the trained deep neural network to determine objects.

10. The method of claim 9, further comprising adapting the synthetic image from a first domain to a second domain by modifying the synthetic image to change weather and lighting conditions in the synthetic image.

11. The method of claim 9, further comprising training the VAE-GAN based on unsupervised learning.

12. The method of claim 9, further comprising generating the synthetic images and corresponding ground truth with a photorealistic rendering process.

13. The method of claim 12, wherein the photorealistic rendering process generates the synthetic image and corresponding ground truth based on ray tracing a scene description.

14. The method of claim 9, wherein ray tracing includes tracing a ray of light from a virtual illumination source as it reflects from a surface included in a scene description into a lens of a virtual camera.

15. The method of claim 9, further comprising communicating objects and locations determined in a traffic scene to a vehicle.

16. The method of claim 15, further comprising operating the vehicle based on determining a vehicle path based on the objects and locations.

17. The computer of claim 1, wherein the loss function is determined using a log-likelihood function $\log p_\phi(x|z)$.

18. The computer of claim 1, wherein an output video image can be described by a probability distribution $p_\phi(x|z)$, where $\phi$ is the weights and biases included in the encoder neural network and the generator neural network, x is the output video image and z are the hidden variables.

19. The method of claim 9, wherein the loss function is determined using a log-likelihood function log $p_\phi(x|z)$.

20. The method of claim 9, wherein an output video image can be described by a probability distribution $p_\phi(x|z)$, where $\phi$ is the weights and biases included in the encoder neural network and the generator neural network, x is the output video image and z are the hidden variables.

* * * * *